(12) United States Patent
Nagarathnam et al.

(10) Patent No.: US 11,036,765 B1
(45) Date of Patent: Jun. 15, 2021

(54) SYSTEM AND METHOD FOR DYNAMIC DATA INGESTION

(71) Applicant: JPMorgan Chase Bank, N.A., New York, NY (US)

(72) Inventors: Ganesh Nagarathnam, New York, NY (US); Mandar Joshi, New York, NY (US); Balaji Natesan, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 234 days.

(21) Appl. No.: 15/459,207

(22) Filed: Mar. 15, 2017

(51) Int. Cl.
*G06F 16/28* (2019.01)
*G06Q 10/10* (2012.01)

(52) U.S. Cl.
CPC .......... *G06F 16/285* (2019.01); *G06Q 10/10* (2013.01)

(58) Field of Classification Search
CPC .......................... G06F 17/30598; G06Q 10/10
See application file for complete search history.

(56) References Cited

U.S. PATENT DOCUMENTS

| | | | | |
|---|---|---|---|---|
| 9,152,464 B2* | 10/2015 | Abouzour | ............. | G06F 9/5027 |
| 9,426,219 B1* | 8/2016 | Keyser | ................ | H04L 67/1097 |
| 2007/0043639 A1* | 2/2007 | Tabs | ....................... | G06Q 40/00 705/35 |
| 2009/0112747 A1* | 4/2009 | Mullen | ................... | G06Q 20/04 705/35 |
| 2012/0159506 A1* | 6/2012 | Barham | ................ | G06F 9/5044 718/104 |
| 2012/0173581 A1* | 7/2012 | Hartig | ..................... | G06F 21/52 707/781 |
| 2012/0278587 A1* | 11/2012 | Caufield | ................. | G06F 9/505 711/173 |
| 2014/0019993 A1* | 1/2014 | Mathur | ..................... | G06F 9/54 719/313 |
| 2017/0177414 A1* | 6/2017 | Newbern | .............. | G06F 9/5072 |

* cited by examiner

*Primary Examiner* — James Trujillo
*Assistant Examiner* — J Mitchell Curran
(74) *Attorney, Agent, or Firm* — Greenblum & Bernstein, P.L.C.

(57) ABSTRACT

A method is provided for dynamic ingestion of data. The method includes detecting presence of data sets in an input queue, each data set belonging to a group. The method additionally includes fetching the data sets from each group utilizing a parallel computation engine including multiple partitioned processors, wherein each group is assigned to a partition of one of the multiple partitioned processors for processing. The method further includes processing the data sets for each group utilizing a group level process of the multiple partitioned processors to obtain resultant data sets and transmitting the resultant data sets for each group to a business logic processor pool in order to process the data sets in accordance with existing rules in order to generate a final data set.

20 Claims, 4 Drawing Sheets

SYSTEM AND METHOD FOR DYNAMIC DATA INGESTION

FIELD OF THE INVENTION

Embodiments of the present invention are generally related to a framework for the regular and systematic processing of large quantities of data in order to meet strict regulatory timelines.

BACKGROUND OF THE INVENTION

Many large organizations are required to process large amounts of data on a regular schedule in order to comply with regulatory and reporting requirements. Financial institutions are increasingly burdened with wide-ranging regulatory reporting requirements that involve capturing, processing, and delivering vast quantities of data. The reporting process requires a number of infrastructure resources including servers and storage apparatus. In order to efficiently manage reporting requirements, the infrastructure resources must operate with regularity, often repeatedly for large time blocks through the course of a business day and after termination of the business day.

As an example, regulatory obligations require large financial institutions to report all global holdings with various securities if stipulated thresholds are breached. The requirements apply to holdings of all global subsidiaries, and the holdings include various types of securities, such as equities, fixed income, stock lending, OTC etc. With diverse types of holdings and vast geography, it becomes challenging to meet the strict regulatory timelines. In a single day, large financial institutions may receive close to one hundred million positions and transactions for more than fifty thousand companies and it is necessary to generate a report for every company with respect to a rule or protocol when a threshold is breached. Furthermore, large financial institutions may operate in jurisdictions numbering more than two hundred and hundreds of rules may cover that entire footprint. Jurisdictions generally have complex regulatory protocols or rules for reporting the aggregate holdings that breach a certain threshold and these jurisdictions have stringent deadlines for day to day regulatory reporting.

Currently, many institutions utilize a legacy application framework implementing batch processing to perform the required reporting functions. While such a framework can allow an organization to meet regulatory time deadlines, the legacy architecture is not designed to handle global data. Hence the legacy application is required to run for almost an entire day with regional data processing. For example, with existing systems, the legacy application may generate holdings every day on three different zones that financial institutions operate, namely North America (NAM), Europe, Middle East & Africa (EMEA) and Asia Pacific (APAC). This process can take as many as twelve to fourteen hours to complete. Accordingly, any adjustments required to the data processed result in enormous overhead.

Accordingly, a new and more efficient system is needed to replace the legacy systems in order to expedite compliance with reporting requirements and minimize overhead required to reduce costs and save time.

SUMMARY OF THE INVENTION

Embodiments of the invention are directed to a dynamic ingestion method. The method includes detecting the presence of data sets in an input queue, each data set belonging to a group, and fetching the data sets from each group utilizing a parallel computation engine. The parallel computation engine includes multiple partitioned processors and each group is assigned to one of the partitions of the multiple partitioned processors for processing. The method additionally includes processing the data sets for each group utilizing a group level process of the multiple partitioned processors to obtain resultant data sets and transmitting the resultant data sets for each group to a business logic processor pool. The business logic processor pool processes the data sets in accordance with existing rules in order to generate a final data set and transmits the final data set for each group to an output queue.

In an additional aspect, a dynamic ingestion system is provided. The system includes an input queue storing data sets, each data set belonging to a group. The system additionally includes a parallel computation engine fetching the data sets from each group of data in the input queue. The parallel computation engine includes multiple partitioned processors, wherein each group is assigned to one of the partitions of the multiple partitioned processors for processing and each partition processes the data sets for each group utilizing a group level process to obtain resultant data sets. The system additionally includes a business logic processor pool receiving the resultant data sets and processing the resultant data sets in accordance with existing rules in order to generate a final data set. The system also includes an output queue for receiving the final data sets.

In embodiments of the invention, the groups are companies and the data sets include aggregate holdings in the companies. Further, in embodiments of the invention, the final data sets include reporting on whether the aggregate holdings breach a predetermined threshold.

Further, the parallel computation engine may dynamically adjust the number and size of partitions in each partitioned data processor.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the presently disclosed invention provide a dynamic ingestion framework that incorporates an architecture for parallel processing of huge amounts of data with dynamic adaptive intelligence. The dynamic ingestion framework may, for example, be used for calculating global holdings for reporting to regulatory agencies when required. The use of the dynamic ingestion framework enables achievement of the required performance. The dynamic ingestion framework further provides flexibility to adjust processing power based on the volume of data provided by each data source. The data sources include, for example, business or company servers.

Figure 1:
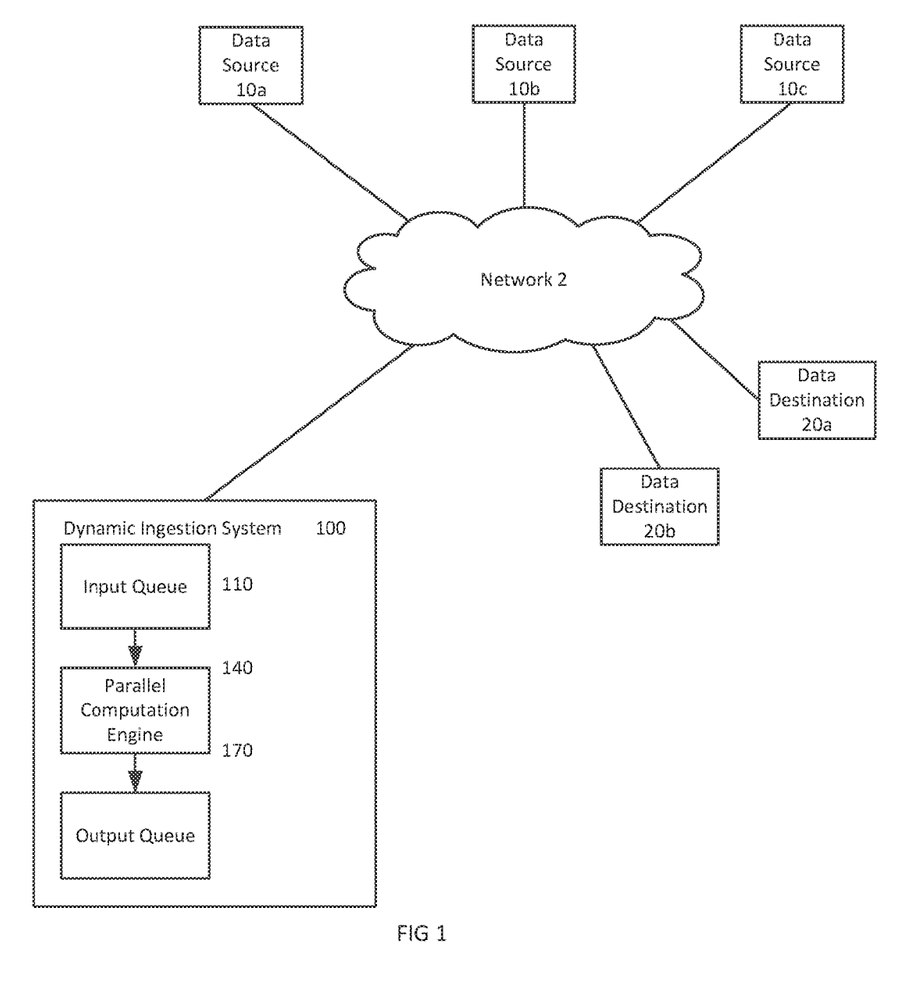
FIG. 1 is a block diagram illustrating an operating environment for the dynamic ingestion system in accordance with an embodiment of the invention.

FIG. 1 is a block diagram illustrating an operating environment for the dynamic ingestion system 100 in accordance with an embodiment of the invention. The operating environment may be data sources 10a, 10b, and 10c data destinations 20a and 20b. All of these systems may be connected over one or more networks 2 to the dynamic ingestion system 100.

The data sources 10a, 10b, and 10c may be or include a wide variety of data sources and systems. Furthermore, although only three data sources are shown, it should be understood that a very large number of data sources may be accommodated. The data sources may include, for example, thousands of company virtual or physical servers or databases.

The data destinations 20a and 20b may include local persistent storage structures, remote persistent storage structures, or other remote or local systems or devices. The data destinations 20a and 20b may include databases or computer storage systems for storing large amounts of data. For example, the data destinations 20 may be Oracle® databases, flat file databases, or horizontally scalable non-relational data structures such as NoSQL databases. The data destinations may also include known storage systems such as an HP SPAR StoreSery® Storage system. Those of ordinary skill in the art will appreciate that other computer storage system for storing large amounts of data are well known in the art. Other structures are within the scope of the invention.

The network 2 may be the Internet or may include other types of networks. For example, the network 2 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. Although only one communication network is shown, multiple communications networks may be utilized for communicating between the displayed components. The network 2 may also include cellular towers operating in conjunction with a provider such as Verizon, AT&T or Sprint or other provider. A cellular network or mobile network is a communication network where the last link is wireless. The network is distributed over land areas called cells, each served by at least one fixed-location transceiver, known as a cell site or base station.

The dynamic ingestion system 100 may include an input queue 110, a parallel computation engine 140, and an output queue 170. As illustrated, data is fed from the input data queue 110 to the parallel computation engine 140 and ultimately to the output queue 170. The dynamic ingestion system 100 may be implemented with various hardware components, including, but not limited to physical and virtual servers, mainframes, storage area networks (SANs), communication network bridges, switches, and routers.

The input data queue 110 may include, for example, a simple first-in first-out (FIFO) data structure. Thus, the data elements are kept in order and the first data elements added to the input data queue 110 will be the first data items removed. As will be further explained below, the input data queue 110 helps to transfer input data in to various partitioned data processors as when needed, based on the volume of data. The input data queue 110 also helps to control the processing resources of the parallel computation engine 140 to enhance hardware stability. The input data queue 110 may also be tasked with bundling all required datasets, so that the partitioned processors of the parallel computation engine 140 can simultaneously process multiple sets of data. As set forth above, the input data may include global positions and trades, corresponding instruments and other reference data points. The input data queue 110 manages and distributes the data load across multiple physical and virtual resources, for example various types of memory structures such as SANs and NAS and virtual and physical servers.

The output queue 170 receives data output from the parallel computation engine 140 upon completion of processing. Similarly to the input queue, the output queue 170 may be a FIFO data structure. The output data queue 170 stages the data before transmission to persistent data storage and serves to de-couple the dynamic ingestion system 100 from the actual data persistence technology. Therefore, the dynamic ingestion system can take advantage of any data persistence based on data volume. For example, Oracle® database software, horizontally scalable structures such as No-SQL databases, flat files etc. may be utilized. In embodiments of the invention, the output queue 170 is connected to UNIX® pipe which pushes data to an Oracle® database via Oracle® built in standard utilities.

Figure 2:
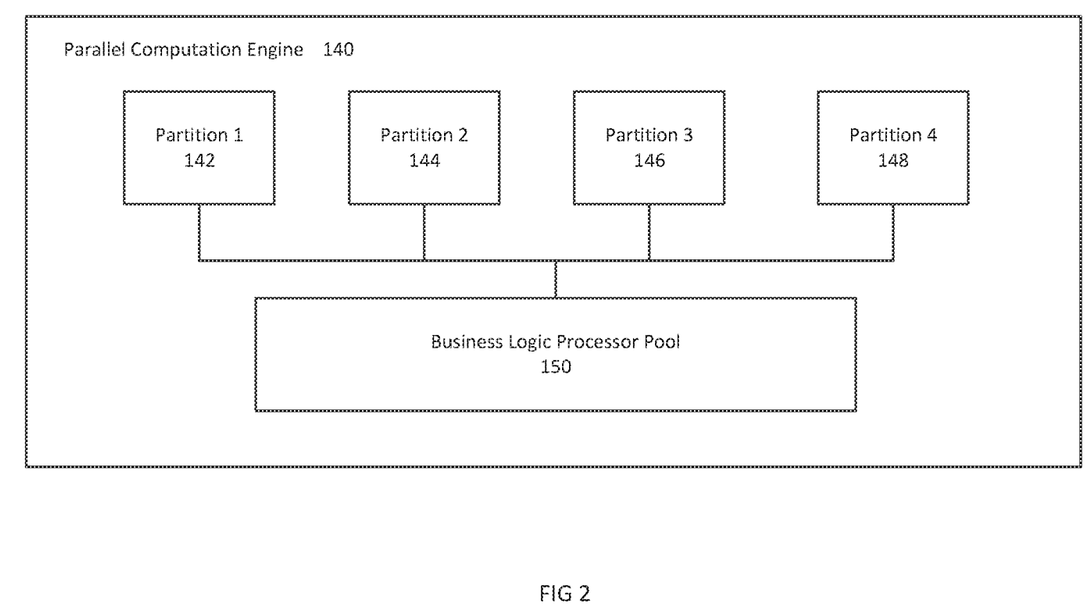
FIG. 2 is a block diagram illustrating components of a parallel computation engine of the dynamic ingestion system in accordance with an embodiment of the invention.

FIG. 2 is a block diagram illustrating components of the parallel computation engine 140 of the dynamic ingestion system 100 in accordance with an embodiment of the invention. The parallel computation engine 140 may include one or more partitioned data processors operating in combination with a decoupled business logic processor pool 150. Thus, the parallel computation engine 140 may include a group of partitions 142, 144, 146, and 148 of one or processors defined by dynamic in memory partitions operating in parallel and communicating with the business logic processor pool 150.

Once data is present in input data queue, the parallel computation engine 140 operates to detect and fetch a data set to perform required processing. Based on the volume of data and time required to process each data set, the number of data sets fetched by one partitioned data processor along with the number of partitioned data processors can be configured by the parallel computation engine 140 in order to scale the system without any service disruption. In order to achieve the maximum throughput and efficiency, the parallel computation engine 140 processes potentially hundreds of rules or protocols concurrently for multiple jurisdictions and for thousands of companies concurrently. In embodiments of the invention, a company is an example of a "group", as further described herein. Other types of groups may include for example, other entities, such as governmental agencies or more loosely organized associations. Thus, each partition concurrently is capable of fetching data for a corresponding company or group and for each company or group, the parallel computation engine 140 may spawn multiple sub concurrent processes for every one of the hundreds of rules or protocols. Thus, the parallel computation engine 140 achieves parallel and concurrent processing of the most granular assets for the company or other type of group. The dynamic in-memory partitions each have the intelligence to adjust their own size depending upon the transaction volume in a day and the parallel computation engine 140 uses the principle of least starved partition for pushing the data at any point in time. The parallel computation engine 140 utilizes a classic synchronous and asynchronous mode of processing principles in a scalable and dynamically extensible concurrent processing framework. The parallel computation engine 140 exposes core processing algorithms as a service. Because the parallel computation engine 140 is loosely coupled, regression test cases are automated with ease, thereby creating a significant reduction on quality assurance costs. The parallel computation engine 140 can be tuned dynamically with an increase or decrease in the ingestion volume. The parallel computation engine 140 can be developed in to a full blown framework that can act as a hub for parallel processing of complex data structures.

Thus, each partitioned data processor 142, 144, 146, and 148 spawns multiple parallel processes in itself in order to operate on the collected individual data sets for a group. These parallel processes, then pass the resultant datasets for each group to the business logic processor pool 150 to apply business rules. The business logic processor pool 150 may contain a pool of separate processing points for business logic. This business logic processor pool 150 is shared across the multiple partitioned processors. The actual business logic itself is very loosely coupled and can be changed without any change to actual dynamic ingestion system architecture. Also the shared business logic processor pool 150 helps to control the parallel processing of the partitioned data processors, which in turn helps to stabilize CPU/memory usage and increase efficiency and processing speed.

Each business logic processor in the pool 150 processes the received data and generates a final data result. For example, the business logic processor 150 may determine if holdings for of a specific business exceed a pre-set threshold. As soon as the result is generated, the data is written into the above-described output queue and the partitioned data processor feeds a next set of data to business logic processor. With this dynamic coupling, any business logic processor can be used by any partitioned data processor based on availability. Also the parallel computation engine 140 is programmed to change the number of business logic processors depending on required throughput and available resources.

Thus, in operation, every jurisdiction in which a large financial enterprise may operate has complex regulatory protocols also known as rules for reporting the aggregate holdings that breach a certain threshold. These jurisdictions have stringent deadlines for our day to day regulatory reporting. In a single day, the financial enterprise may receive millions of positions and transactions for tens of thousands of companies. The financial enterprise is required to report for every company in any rule or protocol that breaches a threshold. Rules or protocols may number in the hundreds. These reports are generally required on a daily basis. Accordingly, the enhanced speed of the above-described ingestion system utilizing the parallel computation system 140 greatly expedites end of the day reporting.

Figure 3:
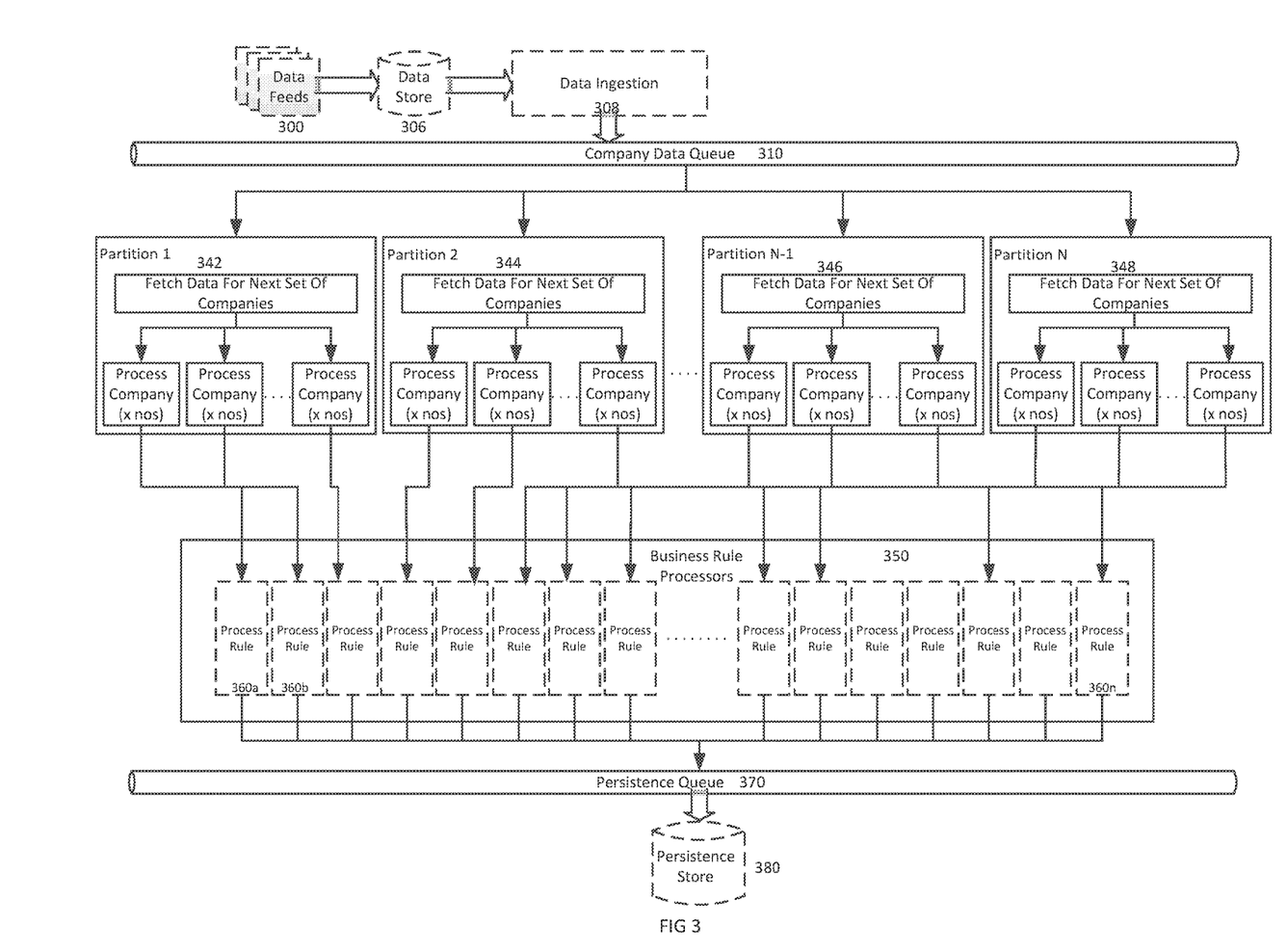
FIG. 3 is a flow diagram illustrating data flow through the dynamic ingestion system in accordance with an embodiment of the present invention.

FIG. 3 is a flow diagram and block diagram illustrating data flow through the dynamic ingestion system in accordance with an embodiment of the present invention. Data feeds 300 are transmitted to a data store 306 and data ingestion for the ingestion framework begins at 308. The data store 306 may be or include a memory structure including a database and the data ingestion 308 may cause the ingested data to be transmitted to an input queue represented by a company data queue 310. Multiple partitions 342, 344, 346, and 348 of one or more partitioned processors of the parallel computation engine fetch data from the company data queue 310. Each partition of the partitioned processor may select a dataset from a particular source or belonging to a particular group, which in the illustrated instance is a company and the partitioned processors process the data in parallel. In one instance, the partitioned processors may be utilized to aggregate holdings or positions for each of the companies represented in the company data queue 310. These partitions 342, 344, 346, and 348 of the data processor fetch company data from the company data queue 310 and spawn multiple processes for each company. Each company level process feeds this data to multiple business logic processors or rule processors 350. In embodiments of the invention, each rule 360a . . . 360n has predefined business logic based on jurisdiction regulatory obligations. These rule processors 350 generate the aggregates and percentage holdings for the company using the predefined rules. The business logic processor feeds the output to the data output queue or persistence queue 370. The persistence queue 370 may be connected to a persistence store 380.

Elements including the data feeds 300, data store 306, rules 360, and persistence queue 380 may be pluggable components adding specific features to the system. Thus, the system as a whole enables and facilitates customization. The parallel computation engine may provide services for the plug-ins, including a method for plug-ins to register themselves with the parallel computation engine and a protocol for the exchange of data with plug-ins. Thus, the parallel computation engine may operate independently of the plug-ins, making it possible to add and update the plug-ins dynamically without needing to make changes to the parallel computation engine. A shared library may be utilized to implement plug-in functionality.

Figure 4:
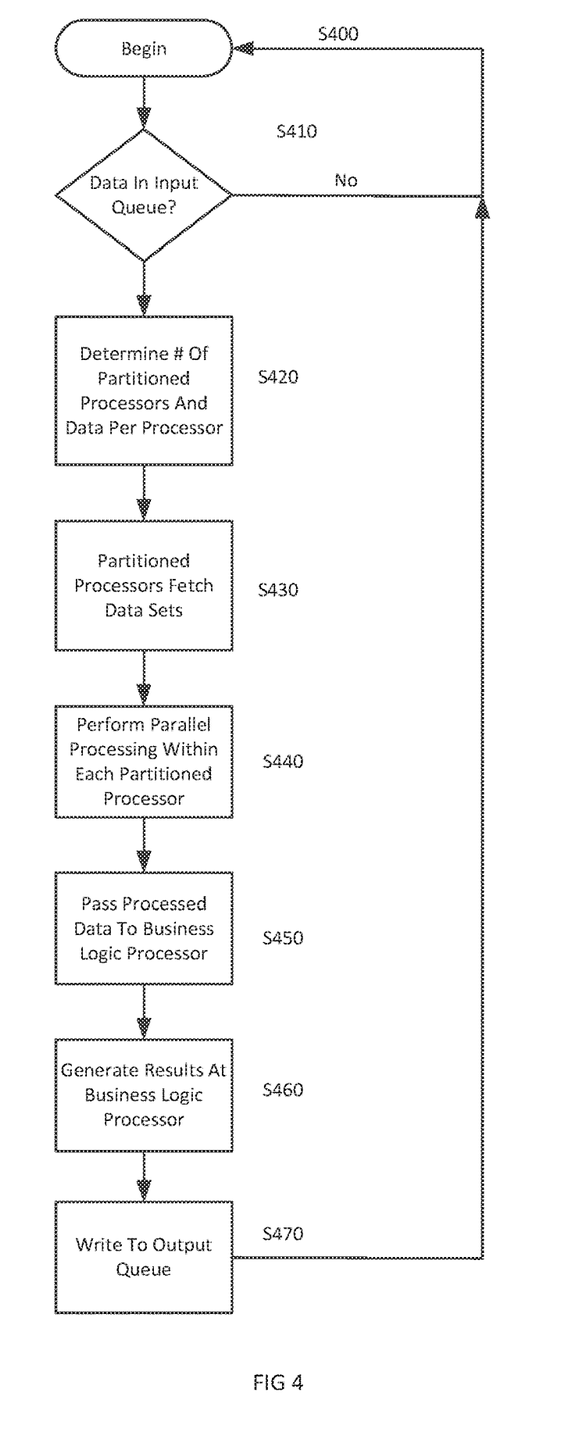
FIG. 4 is a flow chart illustrating a dynamic ingestion method in accordance with an embodiment of the invention.

FIG. 4 is a flow chart illustrating a dynamic ingestion method in accordance with an embodiment of the invention. The method begins in S400. In S410, the parallel computation engine including the multiple partitioned data processors determines if data is present in the input queue. If data is present in the input queue in S410, the parallel computation engine determines a number of partitioned data processors and a number or partitions required. In S430, the required partitioned data processors fetch data sets for at least one group. For example, each partitioned processor may fetch data sets corresponding to a particular company. In S440, the partitioned data processors perform parallel processing on each retrieved data set. In S450, the partitioned data processors pass the processed data as a resultant data set to the pool of business logic processors. In S460, the business logic processors generate a result and in S470, the business logic processors write the result to the output queue. Additional steps may be included in the method and the steps may be performed in an alternative order.

In embodiments of the invention, the dynamic ingestion system is utilized in conjunction with a global position aggregation system. Thus, the input data includes global positions and trades, corresponding instruments and other reference data points. The input data queue manages and distributes the load across multiple physical & virtual resources. The partitioned data processors fetch company data from the input data queue and start spawning multiple processes for each company. Each company level process feeds this data to multiple business logic processors, also called rule processors. Each rule has predefined business logic based on jurisdiction regulatory obligations. These rule processors generate the aggregates and percentage holdings for the company using predefined rule. Ultimately, the output is fed to output data queue for persistence. The output data queue may be connected to UNIX® pipe which pushes data to Oracle® database via Oracle® built in standard utilities.

The result sets transmitted to the output queue may be or include reports of global holdings with respect to various securities, if the holdings were determined to breach stipulated thresholds. This may include all holdings from a financial enterprise and its subsidiaries around the globe. The holdings may include various types of securities like equities, fixed income, stock lending, OTC etc. Thus, embodiments of the invention may be used in combination with a global position aggregation system to compute firm wide aggregate holdings for an enterprise compliant with regulatory jurisdictional protocols across the globe. The resultant computations may be utilized by compliance teams for filing with the appropriate regulatory agencies every day or on an alternative regular schedule.

The above-described solution enables the dynamic ingestion system to have an optimal memory footprint and the calculations of the aggregate holdings are achieved at a lightning speed proven to be eighty six times faster processing time than the pre-existing legacy regional batch processes. In specifically tested enterprise solutions, the legacy system took approximately fourteen hours to compute and deliver the required information for three different regions (EMEA, NAM and APAC) and the above-described solution took seven minutes for all of the regions and in the full capacity. Accordingly, embodiments of the invention provide improved processing speed of the computing system for the tested application.

Thus, the dynamic ingestion system can act as a hub for parallel processing of complex data structures. The data ingestion component and the persistence layer are loosely coupled with the parallel computation engine and horizontal scalability can be easily realized with very minimal configuration changes. The business logic layer that does the computation can be easily replaced with any custom logic solution.

All of the components shown in the FIGs. above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Although many other internal components of the computer are not shown, those of ordinary skill in the art will appreciate that such components and the interconnections are well known. Accordingly, additional details concerning the internal construction of the computer need not be disclosed in connection with the present invention.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A dynamic ingestion method comprising:
    detecting presence of data sets in an input queue, each data set includes aggregate holdings belonging to a group, the aggregate holdings bundled by the input queue based on the group;
    calculating a first amount of partitioned data processors required to process the detected data sets and a second amount of partitions required to process the detected data sets;
    fetching the data sets from each group utilizing a parallel computation engine, the parallel computation engine including multiple partitioned processors and a business logic processor pool decoupled from the multiple partition processors that is utilizable by each of the multiple partitioned processors, wherein each group is assigned to a partition of one of the multiple partitioned processors for processing;
    processing the data sets for each group utilizing a group level process of the multiple partitioned processors to obtain resultant data sets, the resultant data sets including at least one report comprising the aggregate holdings identified as breaching at least one stipulated threshold;
    dynamically adjusting a quantity of business logic processors in the business logic processor pool based on available resources;
    transmitting the resultant data sets for each group to the business logic processor pool in order to process the data sets in accordance with existing rules in order to generate a final data set; and
    transmitting the final data set for each group to an output queue, the output queue decoupling the parallel computation engine from a data persistence technology by staging the final data set for the data persistence technology,
    wherein the existing rules include one or more regulatory protocols from a regulatory agency, and
    wherein the existing rules are stored in plug-in components that are pluggable into the parallel computation engine, each plug-in component being dynamically updated, added, or removed independently from the parallel computation engine.

2. The method of claim 1, further comprising bundling received data into the datasets at the input queue.

3. The method of claim 1, further comprising:
    dynamically adjusting a number of partitions in at least one partitioned processor; and
    dynamically adjusting a quantity of datasets fetched by each partitioned processor.

4. The method of claim 1, further comprising sharing the business logic processor pool across multiple partitions.

5. The method of claim 1, further comprising feeding a next set of data to the business logic processor pool when the business logic processor pool generates the final data set.

6. The method of claim 1, further comprising dynamically adjusting a quantity of business logic processors in the business logic processor pool based on throughput.

7. The method of claim 1, further comprising staging the final data set in the output queue prior to persistence.

8. The method of claim 1, wherein each group is a company and the data corresponds to aggregate positions.

9. A dynamic ingestion system comprising:
    an input queue storing data sets, each data set includes aggregate holdings belonging to a group, the aggregate holdings bundled by the input queue based on the group;
    a parallel computation engine
        calculating a first amount of partitioned data processors required to process the detected data sets and a second amount of partitions required to process the detected data sets;
        fetching the data sets from each group of data in the input queue, the parallel computation engine including multiple partitioned processors and a business logic processor pool decoupled from the multiple partitioned processors that is utilizable by each of the multiple partitioned processors; and
        dynamically adjusting a quantity of business logic processors in the business logic processor pool based on available resources,
        wherein each group is assigned to a partition of one of the multiple partitioned processors for processing and each partition processes the data sets for each group utilizing a group level process to obtain resultant data sets, the resultant data sets including at least one report comprising the aggregate holdings identified as breaching at least one stipulated threshold;
    the business logic processor pool receiving the resultant data sets and processing the resultant data sets in accordance with existing rules in order to generate a final data set; and
    an output queue for receiving the final data sets, the output queue decoupling the parallel computation engine from a data persistence technology by staging the final data sets for the data persistence technology,
    wherein the existing rules include one or more regulatory protocols from a regulatory agency, and
    wherein the existing rules are stored in plug-in components that are pluggable into the parallel computation engine, each plug-in component being dynamically updated, added, or removed independently from the parallel computation engine.

10. The system of claim 9, wherein the input queue bundles received data into the datasets.

11. The system of claim 9, wherein the parallel computation engine dynamically adjusts a number of partitions in at least one partitioned processor, and dynamically adjusts a quantity of datasets fetched by each partitioned processor.

12. The system of claim 9, wherein the business logic processor pool is shared across multiple partitions.

13. The system of claim 9, wherein the parallel computation engine feeds a next set of data to the business logic processor pool when the business logic processor pool generates the final data set.

14. The system of claim 9, wherein the parallel computation engine dynamically adjusts a quantity of business logic processors in the business logic processor pool based on throughput.

15. The system of claim 9, wherein the output queue stages the final data set prior to persistence.

16. The system of claim 9, wherein each group is a company and the data corresponds to aggregate positions.

17. The method of claim 1, wherein the group level process for processing the data sets for each group comprises:
   generating multiple parallel processes within each processor to operate on the data sets for each group.

18. The system of claim 9, wherein the group level process for processing the data sets for each group comprises:
   generating multiple parallel processes within each processor to operate on the data sets for each group.

19. The method of claim 4, wherein the shared business logic pool is operable to control the parallel processing of the multiple partitioned processors.

20. The system of claim 12, wherein the shared business logic pool is operable to control the parallel processing of the multiple partitioned processors.

* * * * *